United States Patent [19]
Arai et al.

[11] Patent Number: 5,583,828
[45] Date of Patent: Dec. 10, 1996

[54] METHOD AND APPARATUS FOR DETECTION OF EDGE POSITION THICKNESS OR SPLICE POSITION OF A MATERIAL WEB

[75] Inventors: Hiroaki Arai, Kokubunji; Yuji Ohsawa, Tokyo, both of Japan

[73] Assignees: Nireco Corporation, Tokyo, Japan; Horton Manufacturing Co., Inc., Minneapolis, Minn.

[21] Appl. No.: 414,607

[22] Filed: Mar. 31, 1995

[30] Foreign Application Priority Data

Apr. 5, 1994 [JP] Japan .................................. 6-066991
May 27, 1994 [JP] Japan .................................. 6-114927

[51] Int. Cl.⁶ ............................. G01B 17/00; B23Q 15/00
[52] U.S. Cl. ............................. 367/118; 364/550; 226/45; 73/159
[58] Field of Search ................................ 367/118, 124, 367/135; 364/469, 550; 226/15, 18, 45; 73/159, 599

[56] References Cited

U.S. PATENT DOCUMENTS 3,254,888  6/1966  Street ........................................ 271/263
4,567,749  2/1986  Amblard et al. ........................... 73/599
4,901,292  2/1990  Schrauwen ................................ 367/118
5,072,414  12/1991  Buisker et al. ............................ 364/550

Primary Examiner—Ian J. Lobo
Attorney, Agent, or Firm—Lowe, Price, LeBlanc & Becker

[57] ABSTRACT

A series of pulses of ultrasonic wave emitted from the transmitter with a specified period are received by the receiver. The received signals are rectified to a smooth wave with a single peak. The occurrence time of the peak is determined to gain and store the peak value, which corresponds to the edge position, thickness or splice position of the web. Alternatively, the transmitter emits a series of pulses of ultrasonic wave with a specified period and the peak value in the signals received by the receiver is once held in the peak-holding circuit. The peak voltage held is discharged and reduced with the discharge device and smoothing of the charged voltage yields its mean value, which corresponds to the edge position, thickness or splice position of the web.

3 Claims, 7 Drawing Sheets

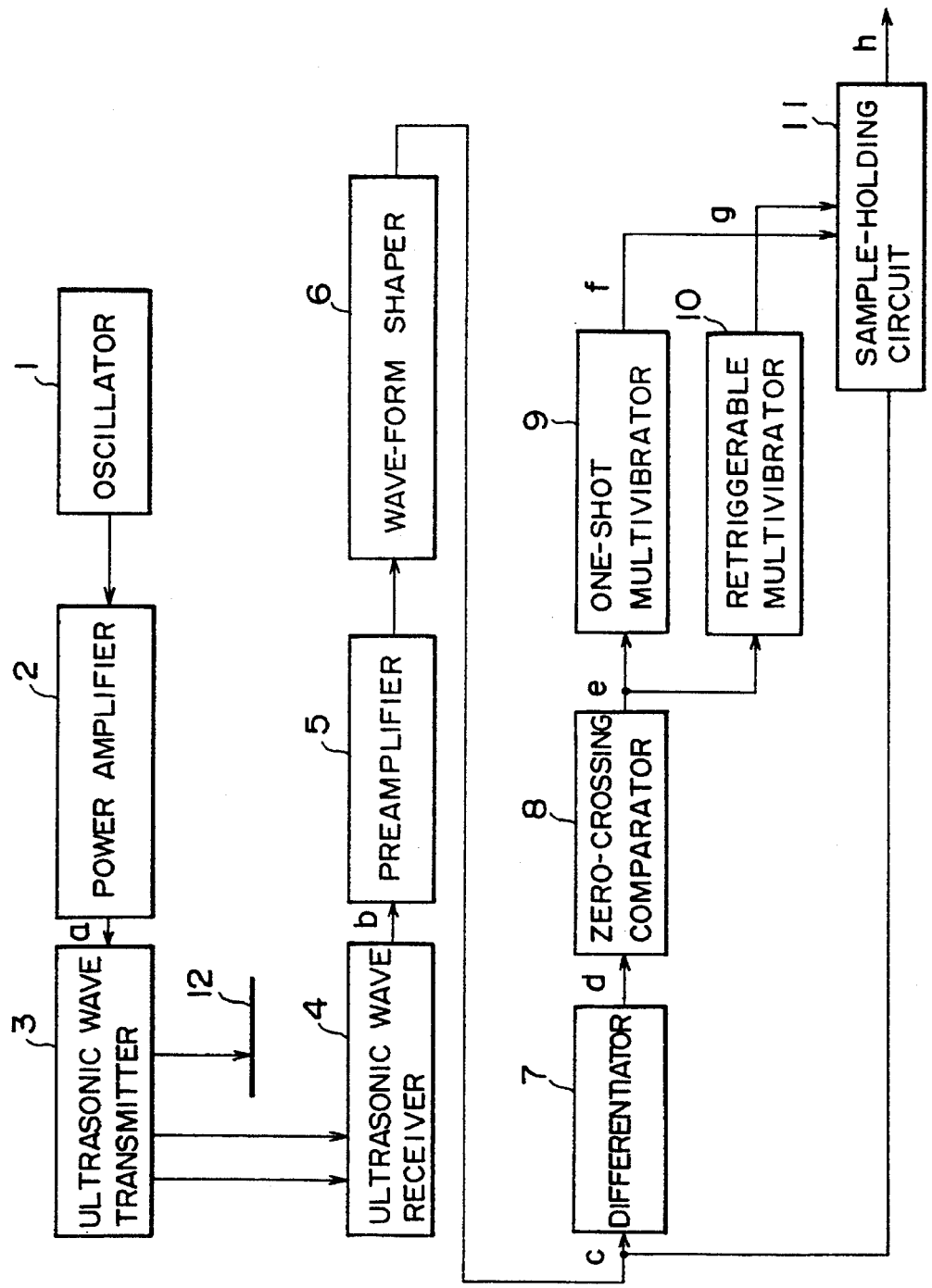

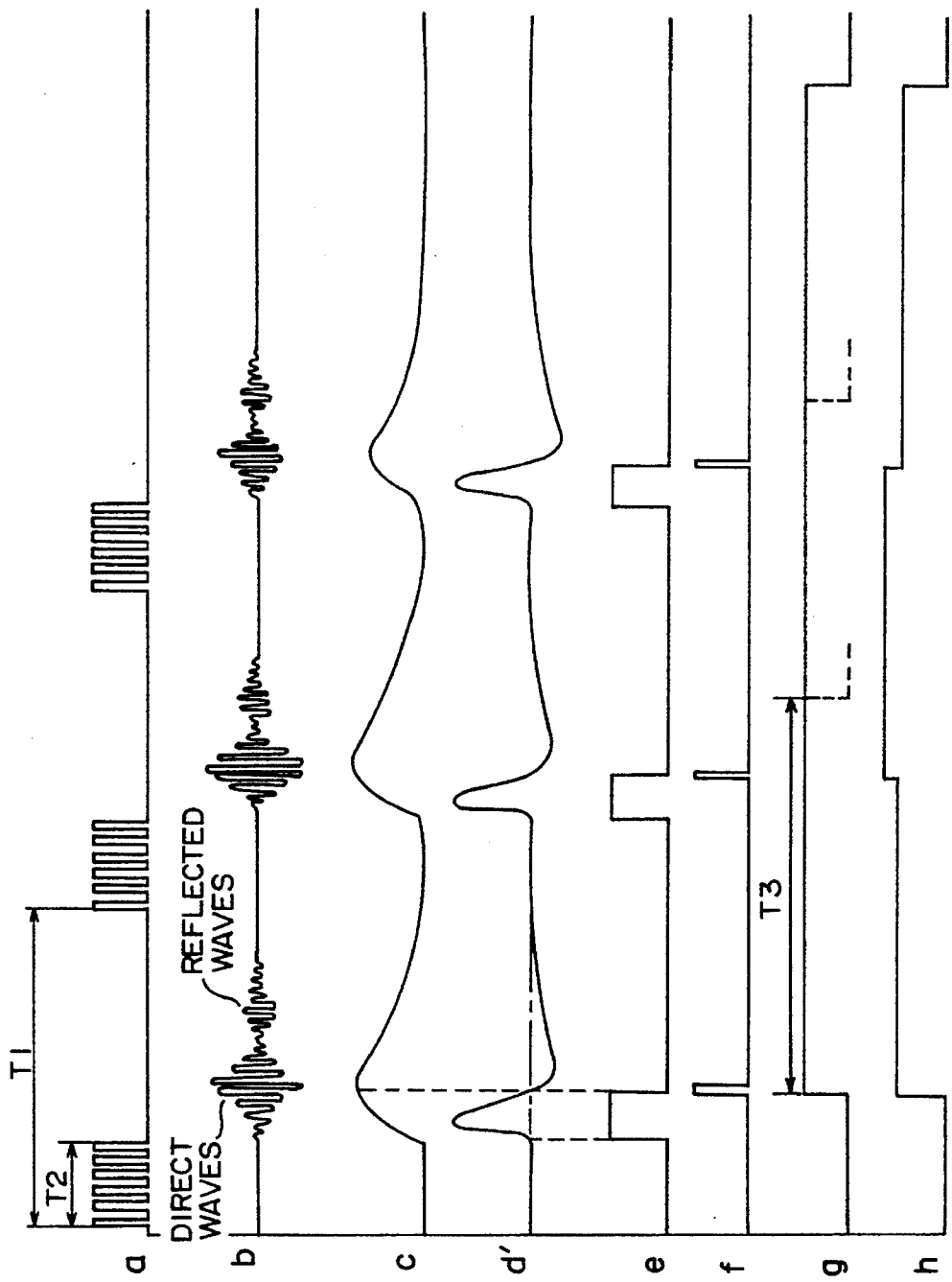

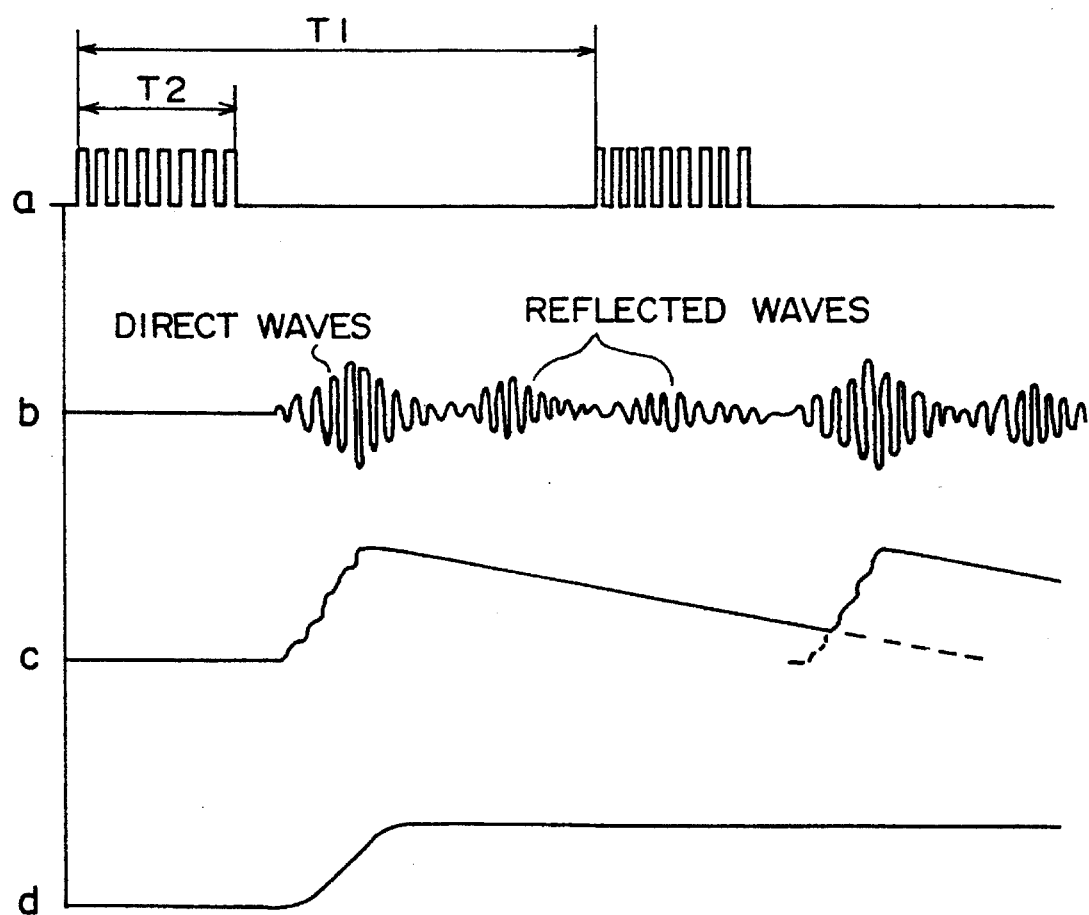
F I G. 7

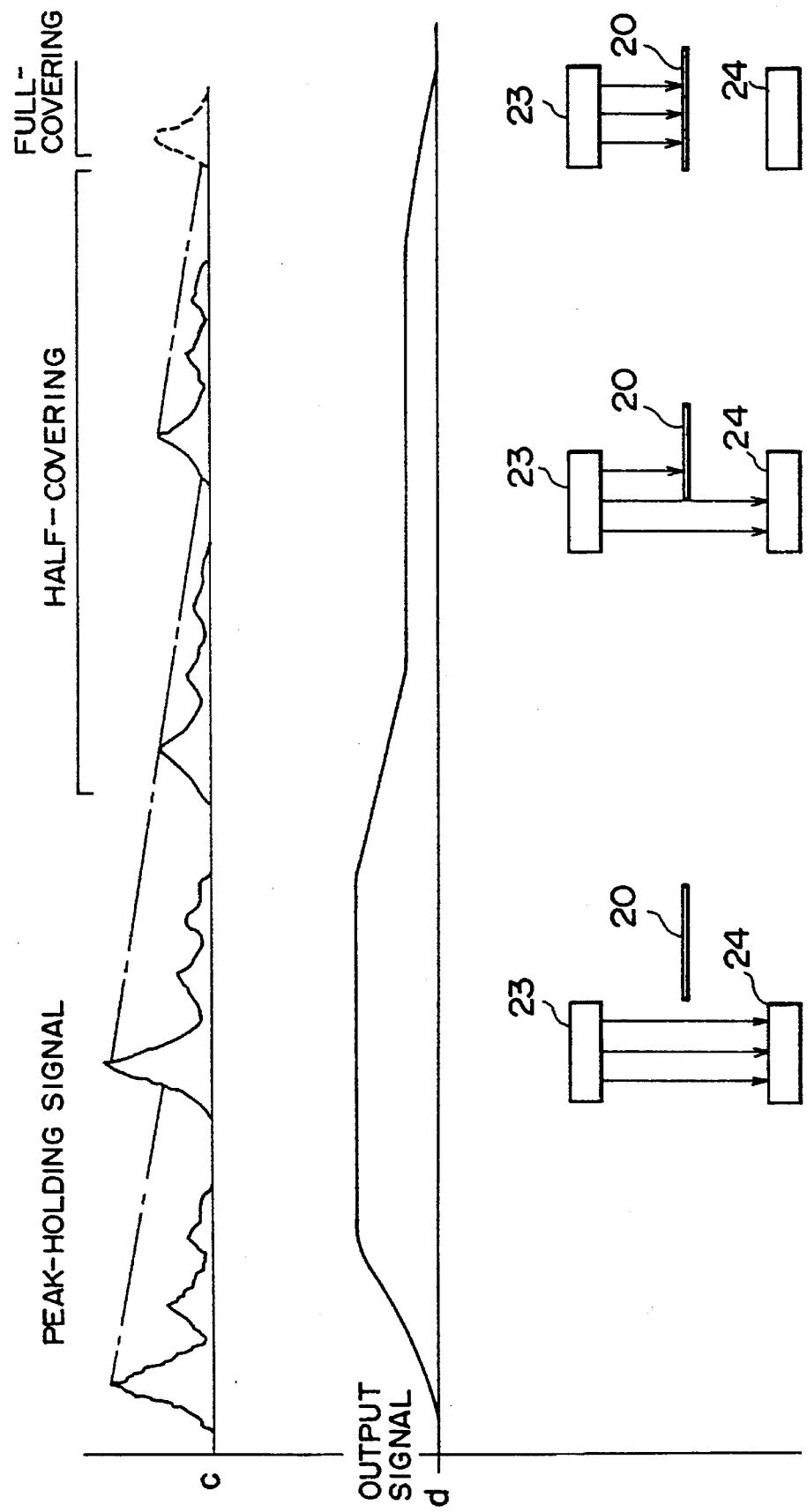

METHOD AND APPARATUS FOR DETECTION OF EDGE POSITION THICKNESS OR SPLICE POSITION OF A MATERIAL WEB

BACKGROUND OF THE INVENTION

1. Field of the Invention

This invention relates to a method and apparatus for detection by means of ultrasonic waves of edge position, thickness or splice position of a material web moving between a transmitter and a receiver of ultrasonic waves.

2. Description of the Prior Art

Various techniques have been utilized to sense the edge position of a material web, including optical methods in which the edge region of the web is irradiated and the amount of interruption of a beam of light by the web is detected, and pneumatic methods for transparent or photo-sensitive webs in which a stream of air is directed to the web edge from underneath and the change in air pressure above the web edge is detected. In the Japanese Patent Application Provisional Publication No. 62-501520 (family of U.S. Pat. No. 4,901,292) another method is disclosed which senses the edge position by detecting a change in the incident signal to the receiver caused by insertion of the web edge between the transmitter and the receiver of ultrasonic waves that are placed facing one another. In this method the transmitter intermittently emits a series of pulses of ultrasonic wave which are received by the receiver directly or after reflection at the web or the receiver, and the direct waves are extracted in the limited sampling range for the peak value to be transformed into electric signal.

The optical methods cannot be applied to edge detection of transparent webs. On the other hand, in the pneumatic methods the web tends to accumulate the dirt due to air purity and suction of the ambient dust. Moreover, the output signal fluctuates because of undulation or winding in the moving web by change in air stream pressure, and detection becomes unstable due to slow response. In the method of the JPAPP No. 62-501520 sampling of the electrical signals transformed with the receiver is performed in a limited range excluding the reflected waves, so that sampling and reset of received signals in the receiver must be synchronous to the transmission time of the transmitter. Hence, variation in the distance between the transmitter and the receiver needs renewal of the timing signal and a circuit also is required for generation of the sampling and reset signals.

An effect of reflected waves gives rise to the standing wave, so-called beat phenomenon, due to interference with the direct wave. The standing wave cannot proceed because it results from superposition of two waves with an equal amplitude and the reverse directions of proceeding. Occurrence of the standing wave leads to variation in the received signals, making detection impossible. The interference of the direct waves with the reflected waves, however, causes no hindrance in detection of edge position, thickness and splice position of the web if the standing wave is kept from occurring. For their detection is possible by detection of the maximum value of the received waves, in which the direct waves with high peak values precede the reflected waves with lower peak values.

SUMMARY OF THE INVENTION

It is accordingly an object of this invention to provide a method and apparatus for detection of edge position, thickness or splice position of a material web without synchronous generation of a sampling signal and a reset signal in a receiver with wave transmission of a transmitter.

This invention has as another object the provision of a method and apparatus for detection of edge position, thickness or splice position of a material web without utilizing sampling and reset circuits.

In this invention the receiver receives the direct, attenuated, and reflected waves of a series of the ultrasonic pulses emitted from the transmitter. The received waves are rectified by means of wave rectification to yield a smooth rectified wave with a single peak, which indicates the maximum of the absolute values of the received signals. The peak detection step determines the occurrence time of the peak, at which the peak value of the rectified wave is taken and stored in the sample-holding circuit. The edge position, thickness or splice position of the web can be detected by the peak value representing the amplitude of the direct wave unoccluded or transmitted with the web.

The receiver generates the electrical signal according to the occlusion rate of a series of pulses emitted from the transmitter by the web between the transmitter and the receiver. The electrical signals for a series of ultrasonic pulses first arise as high peak values for the direct waves, followed by lower peak values for the reflected waves. The peak value, which is held in the peak-holding circuit, gradually decreases with the discharge step. When the peak value of the reflected wave happens to be higher than the discharge curve, the peak value is held, and then reduced gradually. Smoothing of the output of the discharge step provides the mean value in the discharge curve, which represents the amount of arriving pulses unoccluded by the web to indicate the edge position, thickness or splice position of the web.

BRIEF DESCRIPTION OF THE DRAWINGS

FIG. 1 is a block diagram for the first embodiment of the present invention;

FIG. 3 displays the wave forms of output signals from each circuit in the first embodiment;

FIG. 7 displays the wave forms of output signals from each circuit in the second embodiment; and FIG. 8 illustrates the outputs from the peak-holding circuit and low-pass filter corresponding to the web edge position.

DESCRIPTION OF THE PREFERRED EMBODIMENTS

Figure 2A:
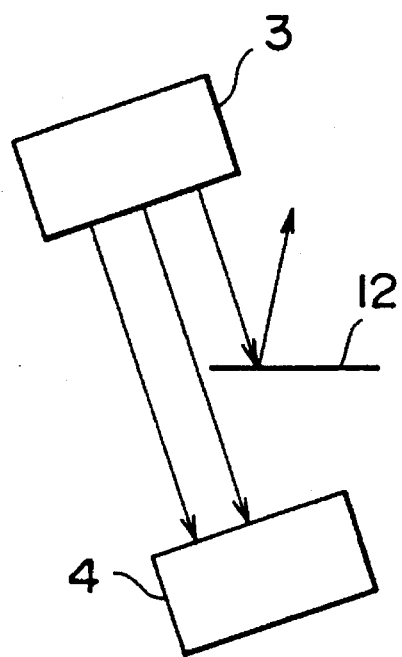
FIG. 2A illustrates a method for reduction of the effect of the reflected waves.

Some preferred embodiments of the present invention will be described hereinbelow with reference to the accompanying drawings.

FIG. 1 is a block diagram showing the structure of the first embodiment of the invention. The oscillator I oscillates with specifying the frequency, amplitude, emission time $T_2$ and period $T_1$ for the pulse series of ultrasonic wave. The power amplifier 2 amplifies the power of the pulse series generated by the oscillator 1. The ultrasonic wave transmitter 3 transforms the power-amplified signals into the ultrasonic waves to emit them. The ultrasonic wave transmitter 3 and the ultrasonic wave receiver 4 are placed facing one another and between them the web 12 is transferred vertically in the drawing. The ultrasonic receiver 4 transforms the ultrasonic waves emitted from the transmitter 3 into the electrical signals on receiving the direct waves arriving unoccluded by the web 12 and the reflected waves at the web 12, receiver 4 and the components in the surroundings. The preamplifier 5 amplifies the electrical signals.

The wave-form shaper 6 rectifies the amplified electrical signals with the diodes to generate the rectified waves with half polarity by the capacitors and resistances, which are adjusted for the rectified wave to have the maximum at the highest peak of the direct waves and smooth damping. The differentiator 7 differentiates the rectified wave to yield the wave form having null voltage at the peak value (the maximum value). The zero-crossing comparator 8 detects the time at which the differentiated wave crosses the null line so that the one-shot multivibrator 9 fires a single pulse with a narrow width at the zero-cross time. The retriggerable multivibrator 10, which is the same circuit as the oneshot multivibrator 9, sets the pulse width at $T_3$ longer than $T_1$, the period of pulse series generated with the oscillator 1, so that the pulse descends after $T_3$ from the most recent input. The sample-holding circuit 11 takes and holds the output of the wave-form shaper 6 at every time of pulse output from the one-shot multivibrator 9. The output of retriggerable multivibrator 10 resets the sample-holding circuit 11.

Figure 2B:
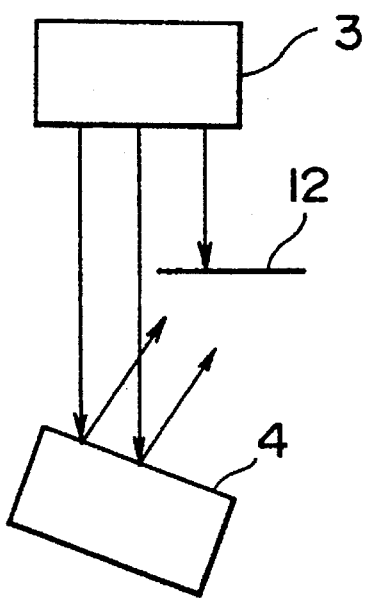
FIG. 2B exhibits another method for reduction of the effect of the reflected waves.

FIGS. 2A and 2B illustrate the methods for reduction of the effects of reflected waves. In FIG. 2A the web 12 is located at a slant position to a series of pulses of ultrasonic wave emitted from the ultrasonic transmitter 3 to the ultrasonic receiver 4 so that the reflected waves from the web 12 cannot reach the ultrasonic transmitter 3 and the ultrasonic receiver 4. In FIG. 2B the receiving surface of the ultrasonic receiver 4 is placed at a slant position to the pulse series emitted from the ultrasonic transmitter 3 to keep the reflected waves from entering in the ultrasonic transmitter 3. These arrangements and selection stated hereinbelow of oscillation conditions for pulses in the oscillator 1 that eliminate the cause of standing waves may sufficiently reduce the effects of reflected waves.

FIG. 3 shows the wave forms a~h generated in the corresponding circuits in FIG. 1.

Figure 4:
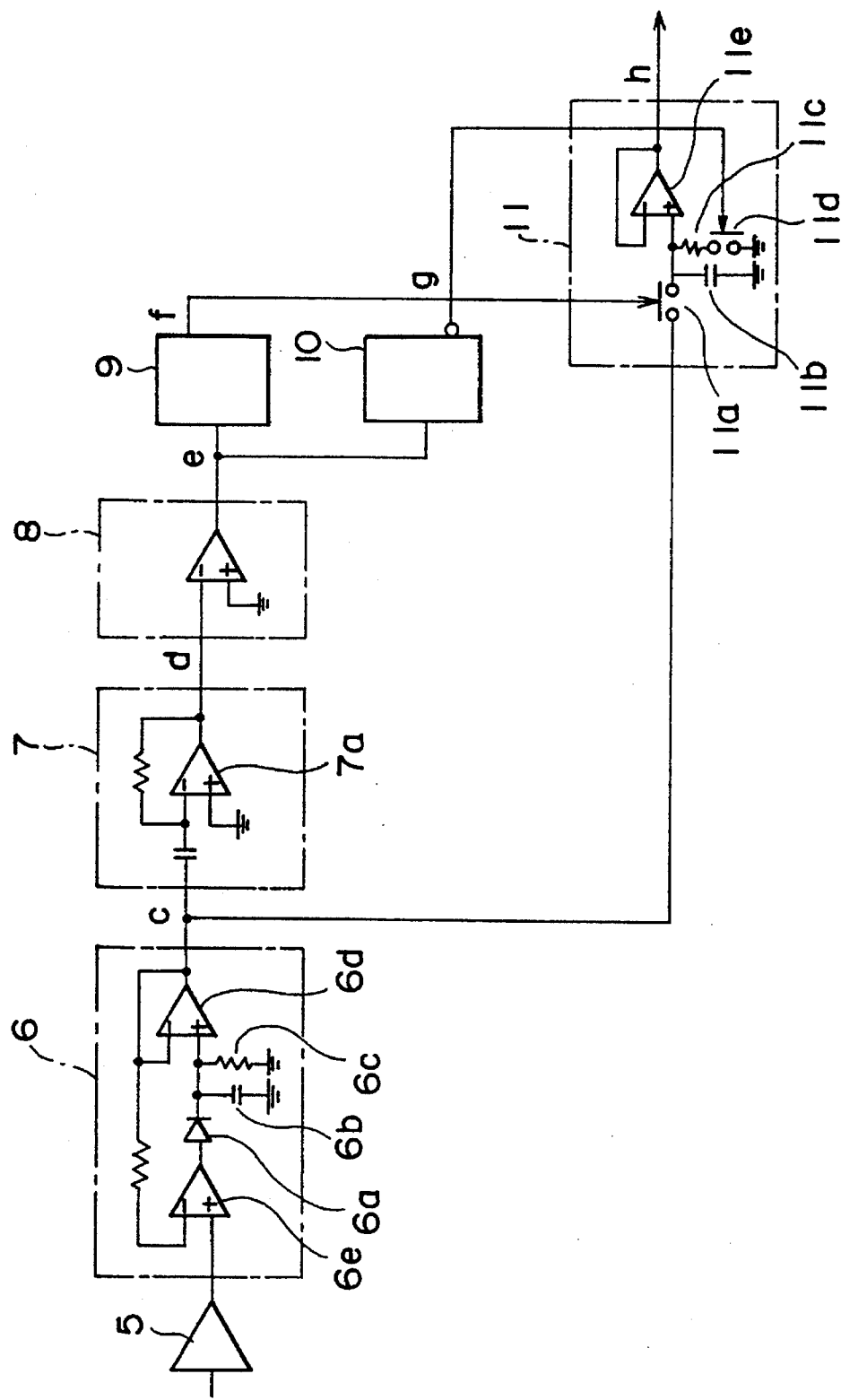
FIG. 4 shows the circuits from the wave-form shaper to the sample-holding circuit.

FIG. 4 displays the exemplary structures of the circuits following the wave-form shaper 6 in FIG. 1. The details of the circuits will be explained in the following with reference to FIGS. 1, 3 and 4.

The form a in FIG. 3 demonstrates the output wave of the power amplifier 2 with the period $T_1$ and the emission time $T_2$ for the pulse series. The values of $T_1$ and $T_2$ are chosen so that the direct wave and the reflected wave yield no standing waves. $T_2$ is set to be shorter than the time taken for the ultrasonic wave to pass to and from between the ultrasonic transmitter 3 and the ultrasonic receiver 4 so that the direct wave from the transmitter 3 is not to meet the reflected wave from the receiver 4. $T_1$ is adjusted so as for the pulse series to reach the receiver 4 after almost disappearance of the reflected waves of the preceding series of pulses. For an instance the ratio of $T_1/T_2$ is taken to be more than 10, which is dependent on the arrangement and the frequency of the ultrasonic wave.

The form b in FIG. 3 displays the output wave of the ultrasonic receiver 4, which in the beginning has the direct waves with large amplitudes, followed by the reflected waves with smaller amplitudes. After disappearance of the reflected waves, there arise the direct waves of the subsequent series of pulses.

FIG. 4 illustrates the wave-form shaper 6, which employs a peak-holding circuit. The diode 6a rectifies the amplified electrical signals in the half wave for its storage in the capacitor 6b, the voltage of which is discharged with the leak resistance 6c. The operational amplifier 6d acts as a voltage follower to hold the charge voltage for the output signal. The operational amplifier 6e has the diode 6a work as ideal diode by preventing the voltage drop (about 0.6 V) of the diode. The values of the capacitor 6b and the leak resistance 6c are chosen so that the discharge voltage for the peak of direct waves is higher than that of reflected waves, vanishing after the lapse of $T_1$. As shown in FIG. 3, the rectified wave thus is generated with a single peak of the maximum value in the direct waves, from which the wave damps smoothly.

The differentiator 7 utilizes the operational amplifier 7a to deliver the output signal proportional to the time derivative (variation) of the input signal. At the peak of the input signal of the form c the time derivative vanishes to give the null output voltage, so that the output signal d of the differentiator 7 crosses the null level to indicate the peak (maximum) of the signal c. The actual output d of the differentiator 7 in FIG. 4 is reversed, and thus output d' in the normal phase is shown in FIG. 3 for easier apprehension.

The zero-crossing comparator 8 comprises an operation amplifier. The comparator is a circuit to determine the voltage difference of the input signal from a reference voltage. The comparator with null reference voltage is called the zero-crossing comparator, which changes the output voltage whenever the input voltage crosses the null line from positive to negative, or from negative to positive. The form e in FIG. 3 demonstrams the output of the zero-crossing comparator 8, which ascends as the signal d' at ascent changes the sign from negative to positive at the null line, and descends as the signal d' changes the sign from positive to negative. The point of descent corresponds to the peak of the signal c.

The one-shot multivibrator 9 is also called monostable multivibrator, which generates a single output of pulse with a constant width in response to input (pulse) signal. This multivibrator usually employs a specific IC. The form f in FIG. 3 shows the output of the one-shot multivibrator 9 that is a short pulse at descent of the signal e.

The retriggerable multivibrator 10 generates an output of pulse with a constant width in response to input (pulse) signal, similarly to the one-shot multivibrator 9, but allows the trigger as many times as applied. When the next input pulse arrives within the lapse of the constant width, a pulse with the constant width is generated at the time of input arrival. In this embodiment the constant width $T_3$ is set to be longer than $T_1$, so that without the next peak (trigger) within the lapse of $T_3$ after the peak of the rectified wave c the pulse acts as the reset signal for completion of the peak signals, as shown in the form g in FIG. 3.

The sample-holding circuit 11 is comprised of input switch 11a, capacitor 11b, switch-protection resistance 11c, reset switch 11d and operational amplifier 11e. The input switch 11a is set ON and OFF to correspond to the ascent and descent of pulse signal from the one-shot multivibrator 9, respectively. The capacitor 11b is charged to the input voltage during ON of the switch. The output voltage (voltage in the capacitor 11b) follows the input signal so as for the voltage at the instant of OFF of the input switch 11a to be held. The descent signal from the retriggerable multivibrator 10 sets the reset switch 11d ON to have the capacitor 11b discharge to 0 V in the output voltage. The operational amplifier 11e works as voltage follower to hold the charge voltage for the output, as shown in the form h in FIG. 3.

The output h in FIG. 3 leads to detection of the edge position of the web 12 in FIG. 1, for the value of h attains the maximum in the absence of the web 12, and vanishes with interruption of the path of ultrasonic waves by the web 12. When the web 12 is in the middle as shown in FIG. 1, the value of h becomes half of the maximum. In practical detection a calibration curve is provided between the position of the web 12 and the value of h to determine precisely the edge position of the web 12. The splice position or thickness of the web 12 also is detectable by measurement of the attenuation of ultrasonic waves in transmission through the web 12.

The pulse generation time is short and the period of pulses is long enough for the effects of ambient reflection to fade away, preventing the standing waves from occurring. The response also is quick since the reset by peak detection takes less time than that by leakage of the leak resistance.

It is obvious from the explanation hereinabove that the first embodiment requires no transmission of sampling signal of peak value in the received signals and reset signal from the ultrasonic transmitter to the ultrasonic receiver. For the standing waves due to the ambient reflection are prevented from occurring and the output of the ultrasonic receiver is formed in the rectified wave with a signal peak, which is detected for sample-holding. Renewal in setting of the sampling signal of peak value and reset signal is also unnecessary for variation in distance between the transmitter and the receiver. Furthermore, the connection line between the transmitter and the receiver is dispensable owing to omission of transmission of the sampling signal of peak value in the received signal and the reset signal from the transmitter to the receiver.

Figure 5:
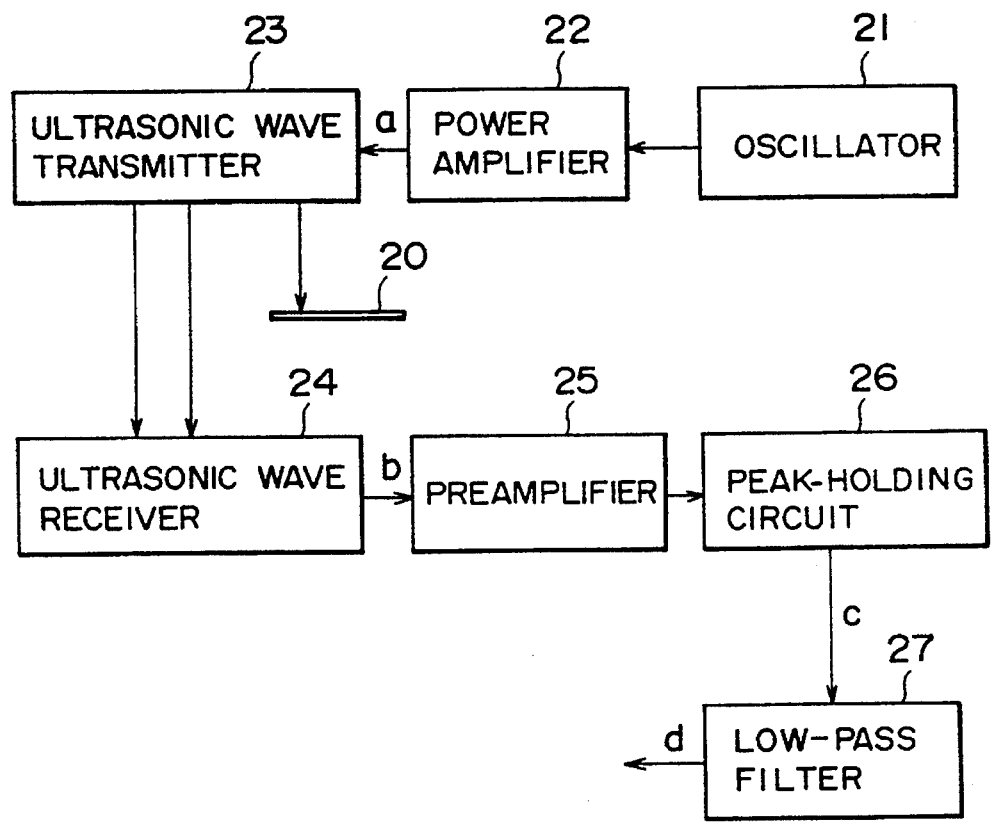
FIG. 5 is a block diagram for the second embodiment of the present invention.

The second embodiment of the invention will be explained in the following. FIG. 5 is a block diagram showing the structure of the second embodiment. The oscillator 21 oscillates with specifying the frequency, amplitude, emission time $T_2$ and period $T_1$ for the pulse series of ultrasonic wave to be emitted. The power amplifier 22 amplifies the power of the series of pulses generated by the oscillator 21. The ultrasonic wave transmitter 23 transforms the power-amplified signals into the ultrasonic waves to emit them. The ultrasonic wave receiver 24 transforms into the electrical signals the direct waves arriving unoccluded by the web 20 after emission from the ultrasonic transmitter 23 and the reflected waves. The preamplifier 2 $ amplifies the electrical signals. The peak-holding circuit 26 with a discharge step holds the peak value of the amplified electrical signals, and discharges the peak voltage to reduce to a specified voltage by reception of subsequent series of pulses, the peak value of which then is held. The low-pass filter 27 is a smooth circuit for smoothing the output of the peak-holding circuit 26 to yield the mean value as the output.

Figure 6:
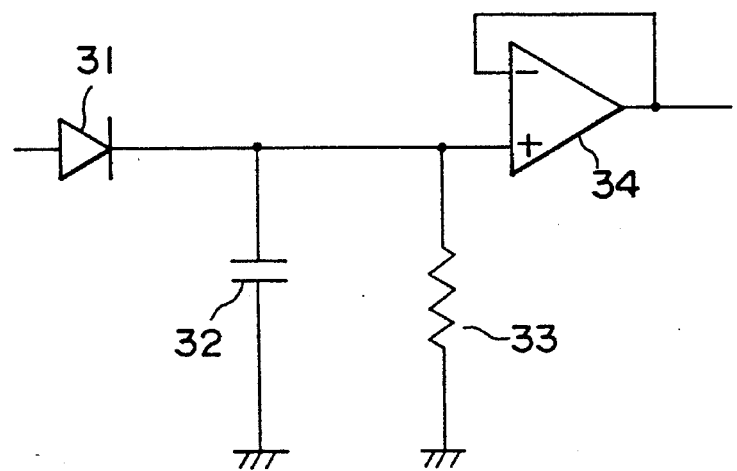
FIG. 6 exhibits the circuit for the peak-holding circuit.

FIG. 6 illustrates the circuit for the peak-holding circuit 26 which is comprised of the rectifier 31 and the capacitor 32, and connected with the leak resistance 33 to discharge continuously for reduction of the charge voltage. The operation amplifier 34 works as voltage follower to hold the charge voltage for the output. Continuous discharge with the leak resistance 33 enables the peak-holding circuit 26 to hold the signals from the subsequent series of pulses.

FIG. 7 shows the wave forms a~d generated in the corresponding circuits in FIG. 5.

The form a in FIG. 7 demonstrates the output wave of the power amplifier 22 with the emission time $T_2$ and the period $T_1$ for the pulse series. The values of $T_1$ and $T_2$ are chosen so that the direct wave and the reflected wave cause no standing waves. $T_2$ is set to be shorter than the time taken for the ultrasonic wave to pass to and from between the ultrasonic transmitter 23 and the ultrasonic receiver 24 and yet long enough for the pulse series to consist of more than several pulses. $T_1$ is adjusted so as for the pulse series to reach the receiver 24 after almost disappearance of the reflected waves of the preceding series of pulses. In this embodiment, for which the distance between the ultrasonic transmitter 23 and the ultrasonic receiver 24 is set at 35 mm with $T_2=0.15$ ms, the number of pulses in the pulse series $=32$ and $T_1=1.5$ ms, the standing waves have not occurred.

The form b displays the output wave of the ultrasonic receiver 24, which in the beginning has the direct waves with large amplitudes, followed by the reflected waves with smaller amplitudes. After almost disappearance of the reflected waves, there arise the direct waves of the subsequent series of pulses.

The form c demonstrates the output wave of the peak-holding circuit 26, for which the capacitor 32 in FIG. 6 is charged to the large peak value of the direct wave first arriving and the charged voltage in the capacitor 32 is discharged and reduced with the leak resistance 33. When the peak value of the reflected wave happens to be higher than the discharge voltage, the peak value is held to the charge voltage, which then is discharged. The gradient of discharge is determined with the CR values of the capacitor 32 and the leak resistance 33.

The form d exhibits the output wave of the low-pass filter 27, which is obtained by smoothing of the curve c. If the damping gradient of the curve c is to be constant, the smoothed values are determined with the peak value held, namely, the peak value of the direct wave first arriving, to represent the covering rate of the ultrasonic receiver 24 or the transmission rate by the web 20. The edge position of web 20 can be detected with the covering rate and the thickness can be measured with the transmission rate.

FIG. 8 illustrates the relationship of the covering rate of the ultrasonic receiver 24 by the web 20 with the curves c and d. The output d is proportional to the peak value in the curve c since the damping gradient of the peak value by the discharge is to be constant. The reflected waves cause no effects because the peak value in the direct waves is higher than that in the reflected waves.

The second embodiment eliminates the circuits for sampling the data unaffected with the reflected waves and resetting the sampled data, simplifying the structure of the circuits to result in decrease of the cost. For occurrence of the standing waves is prevented with the specified conditions for oscillation of ultrasonic waves, and the peak value in the output of the ultrasonic receiver is held and then discharged so that the mean value in the charge voltage is obtained to detect the edge position or thickness of the web.

Although some obvious changes may be made in the specific embodiment of the invention described herein, such modifications are within the spirit and scope of the invention claimed, implying that all materials contained herein are intended as illustrative and not as limiting in scope.

What is claimed is:

1. An apparatus for detection of edge position, thickness or splice position of a material web comprising: a transmitter for emitting a series of pulses of ultrasonic wave to a web in a specified period $T_1$; a receiver placed facing said transmitter for receiving said pulse series and for transforming said pulse series into electrical signals; a wave-form shaper coupled to an output of said receiver for rectifying said pulse signal to a rectified wave having a single peak value; a peak detection device for detecting the occurrence time of said peak value; and a sample-holding circuit coupled to said wave form shaper and to said peak detection device for storing said peak value at said detected occurrence time, wherein said peak-detection device comprises a differentiator for differentiation of outputs of said wave-form rectification device, a zero-crossing comparator for detection of null level of an output of said differentiator, and a one-shot multivibrator for generating a pulse in response to an output of said zero-crossing comparator.

2. A detection apparatus according to claim 1 further comprising a retriggerable multivibrator transmitting to said sample-holding circuit a pulse signal with a specified width $T_3$ longer than a specified period $T_1$ of said pulse series, after reception of output of said zero-crossing comparator, whereby said sample-holding circuit resets a value held in response to said pulse.

3. A detection apparatus according to claim 1, further including an oscillator coupled to said transmitter for setting an emission time $T_2$ of said series of pulses to be shorter than a time taken for an ultrasonic wave to pass from said transmitter to said receiver, and for setting said period $T_1$ of said pulse series for a subsequent series of pulses to reach said receiver after most reflected waves of the preceding series of pulses have disappeared.

* * * * *